(12) United States Patent
Michal

(10) Patent No.: US 10,541,623 B1
(45) Date of Patent: Jan. 21, 2020

(54) CIRCUIT WITH AN INPUT VOLTAGE DIVIDER AND TWO HALF-BRIDGES

(71) Applicant: Infineon Technologies AG, Neubiberg (DE)

(72) Inventor: Vratislav Michal, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/247,347

(22) Filed: Jan. 14, 2019

(51) Int. Cl.
    *H02M 7/487* (2007.01)
(52) U.S. Cl.
    CPC .................... *H02M 7/487* (2013.01)
(58) Field of Classification Search
    CPC .................................................. H02M 7/487
    See application file for complete search history.

(56) References Cited

U.S. PATENT DOCUMENTS

| 9,800,175 | B2* | 10/2017 | Pu | .......................... | H02M 7/06 |
| 2012/0218795 | A1* | 8/2012 | Mihalache | ............ | H02M 7/487 |
| | | | | | 363/97 |

OTHER PUBLICATIONS

V. Michal, "Three-Level PWM Floating H-Bridge Sinewave Power Inverter for High-Voltage and High-Efficiency Applications," in IEEE Transactions on Power Electronics, vol. 31, No. 6, pp. 4065-4074, Jun. 2016. (Year: 2016).*
"Little Box Challenge," Wikipedia, the Free Encyclopedia, last edited on Dec. 17, 2018, accessed on Jan. 14, 2019, 2 pp.
Infineon Technologies, "Power Losses and Thermal Considerations," Electronics 101, accessed from http://www.irf.com/electronics/power-losses on Nov. 8, 2018, 2 pp.
Lindemann, "A New IGBT with Reverse Blocking Capability," IXAN0049, Entwurf Fur EPE Conference, available online from EEWeb Sep. 11, 2014, 7 pp.
Maxim Integrated, "Constant-Frequency, Half-Bridge CCFL Inverter Controller," MAX8729, accessed from https://www.mouser.com/ds/2/256/MAX8729-91509, revised Apr. 2014, 27 pp.
Michal, "Three-Level PWM Floating H-bridge Sinewave Power Inverter for High-voltage and High-efficiency Applications," IEEE Transactions on Power Electronics, vol. 21, Issue 6, first published Sep. 8, 2015, 10 pp.
Rohm Semiconductor, "Switching Regulator IC Series, Calculation of Power Loss (Synchronous)," No. AEK59-D1-0065-2, accessed from http://wwww.rohm.com, Rev. 003, Oct. 2016, 4 pp.

* cited by examiner

*Primary Examiner* — Gary L Laxton
*Assistant Examiner* — Peter M Novak
(74) *Attorney, Agent, or Firm* — Shumaker & Sieffert, P.A.

(57) ABSTRACT

A circuit topology and switching scheme for a circuit that includes an input voltage divider configured to provide a divided voltage that may be approximately half of a supply voltage. The circuit also includes a switching circuit with a first half-bridge that includes a first switching node and a second half-bridge that includes a second switching node. One or more switches are configured to connect the divided voltage to the first switching node and the second switching node.

20 Claims, 9 Drawing Sheets

US 10,541,623 B1

CIRCUIT WITH AN INPUT VOLTAGE DIVIDER AND TWO HALF-BRIDGES

TECHNICAL FIELD

The disclosure relates to switched mode power inverters.

BACKGROUND

Power inverters that convert direct current (DC) to alternating current (AC) include switched-mode power converters. Some power inverters generate multiple voltage level pulse-width modulated (PWM) output voltages based on a multi-level voltage source converter (VSC) power stage. Generation of a multi-level PWM signal is one technique that reduces the triangular AC ripple currents and voltages in the output AC signal. Some circuit architectures for VCS include: (a) neutral point clamped VSC (either diode or active clamped), (b) flying capacitors multilevel power stage, and (c) cascaded H-bridge power stages. These architectures may also be used in a symmetrical H-bridge topology.

SUMMARY

In general, the disclosure is directed to a circuit topology that includes an input voltage divider configured to provide a divided voltage that may be approximately half of a supply voltage. The circuit also includes a switching circuit with a first half-bridge that includes a first switching node and a second half-bridge that includes a second switching node. One or more switches are configured to connect the divided voltage to the first switching node and the second switching node.

In one example, the disclosure is directed to a method comprising: connecting, via at least one bidirectional switch, a first capacitor across a high branch of an input voltage divider and connecting, via the at least one bidirectional switch, a second capacitor across a low branch of the input voltage divider during a first time period, and connecting, via the at least one bidirectional switch, the first capacitor across the low branch of the input voltage divider and connecting, via the at least one bidirectional switch, the second capacitor across the high branch of the input voltage divider during a second time period different from the first time period.

In another example, the disclosure is directed to a system comprising: an input voltage divider configured to provide a divided voltage, wherein the divided voltage is approximately half of a supply voltage, a switching circuit comprising a first half-bridge that includes a first switching node and a first capacitor and a second half-bridge that includes a second switching node and a second capacitor, a first switch, wherein the first switch is configured to connect the divided voltage to the first switching node, a second switch, wherein the second switch is configured to connect the divided voltage to the second switching node. The system may further comprise a controller configured to: control a first transistor of the first half bridge to operate at a line frequency and control a second transistor of the first half bridge to operate at a switching frequency, and connect, via the first switch, the first capacitor across a high branch of the input voltage divider and connect, via the second switch, a second capacitor across a low branch of the input voltage divider during a first time period.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure is directed to a circuit topology for a power inverter to provide DC to AC conversion, as well as techniques for controlling the switching of transistors or other switching devices in the power inverter. The power inverter circuit of this disclosure includes a passive input voltage divider, two half-bridges comprised of serially connected transistors as well capacitors and bi-directional switches to compensate a middle node voltage. The passive voltage divider includes both capacitors and resistors to create $V_{DD}$ voltage division during the non-switching timing of the circuit operation. The two half-bridges form symmetrical legs of switching circuit, such as an H-bridge. The flying capacitors in the half bridges of the circuit of this disclosure perform a different function when compared to other examples of multi-level voltage source converter (VSC) power stages with flying capacitors, described in detail below. The switching control scheme includes two driving signals applied in complementary phases to the power transistors. One set of transistors of the half bridge provide the desired output line frequency (e.g. 50 Hz or 60 Hz) while half bridge transistors used to provide duty-cycle adjusted output generated voltage may switch at a higher frequency, e.g. tens of kHz.

The circuit topology and switching scheme of this disclosure may be applied to both low voltage ranges, e.g. using complementary metal-oxide-semiconductor (CMOS) circuitry, and also high-voltage ranges by using discrete power MOS field effect transistors (MOSFETs), e.g. Si, SiC, GaN or insulated gate bipolar transistors (IGBT). The single phase power inverter circuit topology and switching scheme allows for automatic compensation of the middle voltage node, which provides autonomous operations without the need for a complex control algorithm nor the need for circuit elements in the output path that may reduce circuit efficiency. The circuit also includes accurate control of all floating nodes, which may ensure that the voltage and current magnitudes during operation remain below the maximum rating of all circuit components, which may ensure circuit reliability.

Figure 1:
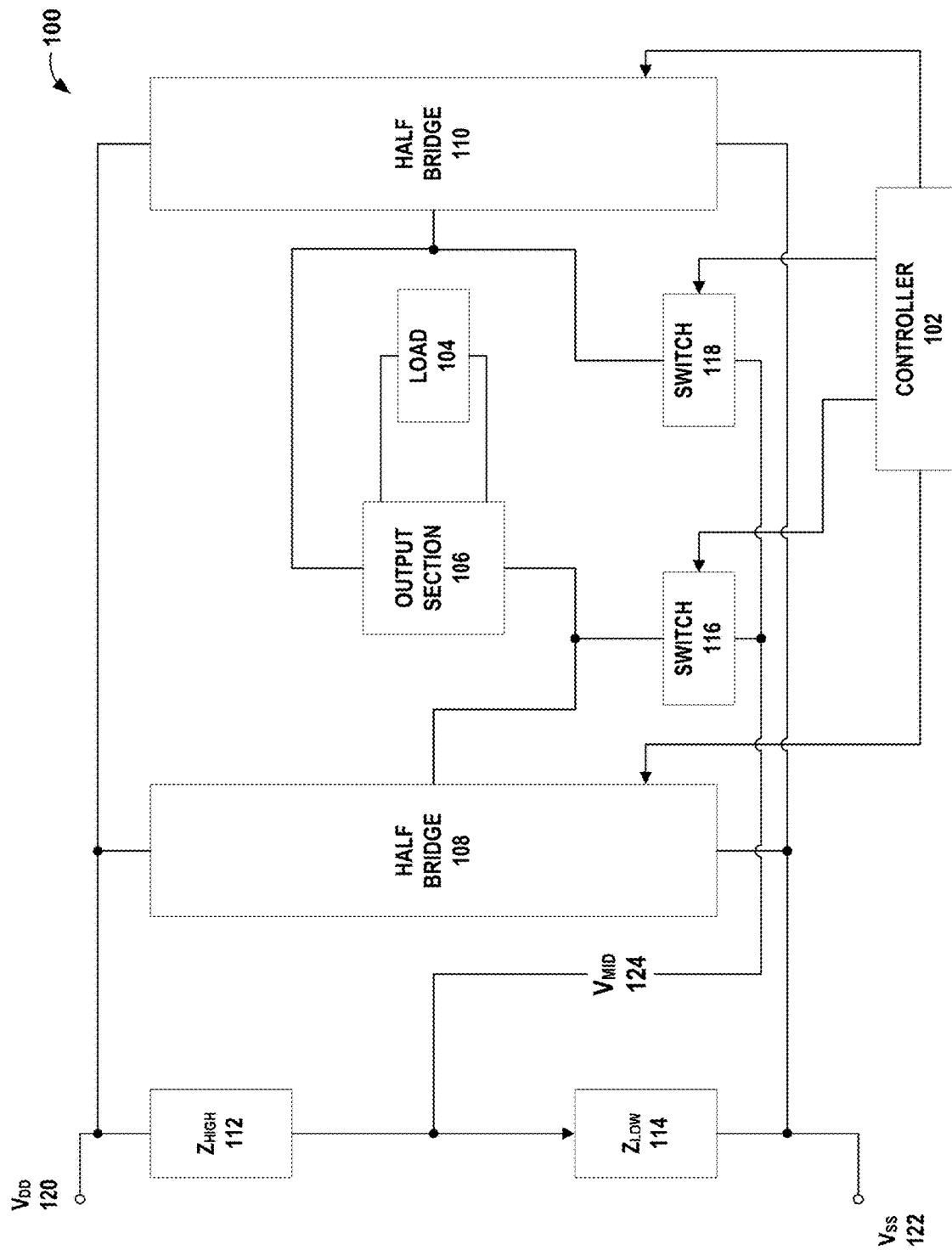
FIG. 1 is a block diagram illustrating a system for converting DC power to AC power according to one or more techniques of this disclosure.

FIG. 1 is a block diagram illustrating a system for converting DC power to AC power according to one or more techniques of this disclosure. The configuration of system 100 provides a multi-level pulse-width modulated (PWM) power inverter with reduced switching loss and Ohmic losses to improve efficiency as well as reduce the number of active components and does not require a complex control circuit. Power inverter system 100 may be used in applications such as motor drives, photovoltaic power conversion, hybrid and electric vehicles and other similar applications.

System 100 includes an input voltage divider formed by Zhigh 112 and Zlow 114. System 100 also includes two half-bridges 108 and 110 that output current to output section 106, which supplies load 104. Switches 116 and 118 alternately connect portions of half bridge 108 and half bridge 110 across the input voltage divider. In some examples, switches 116 and 118 may be bidirectional switches. Controller 102 provides the switch control and timing for system 100.

The input voltage divider is connected between the DC supply voltage Vdd 120 and a reference voltage, Vss 122. In some examples Vss 122 may be a circuit ground and Vdd 120 is a positive voltage with respect to ground. In other examples, Vss 122 may be a negative voltage with respect to ground. Zhigh 112 and Zlow 114 are configured to provide a divided voltage Vmid 124. In some examples, divided voltage Vmid 124 may be approximately half of the difference between supply voltage Vdd 120 and reference voltage Vss 122. In the example in which Vss 122 is ground, Vmid 124 may be one-half Vdd 120. In some examples, high side impedance Zhigh 112 and low side impedance Zlow 114 may include one or more resistors, capacitors, inductors or other types of components.

Half bridges 108 and 110 may include one or more switching elements, such as transistors, and may also include other types of components. In some examples, half bridge 108 and half bridge 110 form a symmetrical switching circuit, such as a symmetrical H-bridge circuit.

The switching nodes of half bridges 108 and 110 connect to output section 106. In some examples, output section 106 may include one or more filtering circuits such as a low-pass filter. Output section 106 supplies AC power to load 104, where load 104 may be any type of load, such as a motor, AC powered appliances, and similar loads.

Controller 102 manages the switching frequency and switch timing for system 100. For example, controller 102 may set the timing for switches 116 and 118 to minimize losses and improve circuit efficiency. For example, controller 102 may turn on switches 116 and 118 during the phase switching when the output current is close to zero which may reduce the effect of any ON-resistance from switches 116 and 118.

Controller 102 is an example of controller circuitry, which may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. Controller 102 may include one or more processors, which may be integrated circuitry, i.e., integrated processing circuitry, and that the integrated processing circuitry may be realized as fixed hardware processing circuitry, programmable processing circuitry and/or a combination of both fixed and programmable processing circuitry.

In some examples the power inverter portion of system 100 may be implemented as an IC. In some examples controller 102 may be included in the same IC package as the power inverter portion of system 100. In other examples, controller 102 may be a separate unit from the remainder of system 100.

Figure 2B:
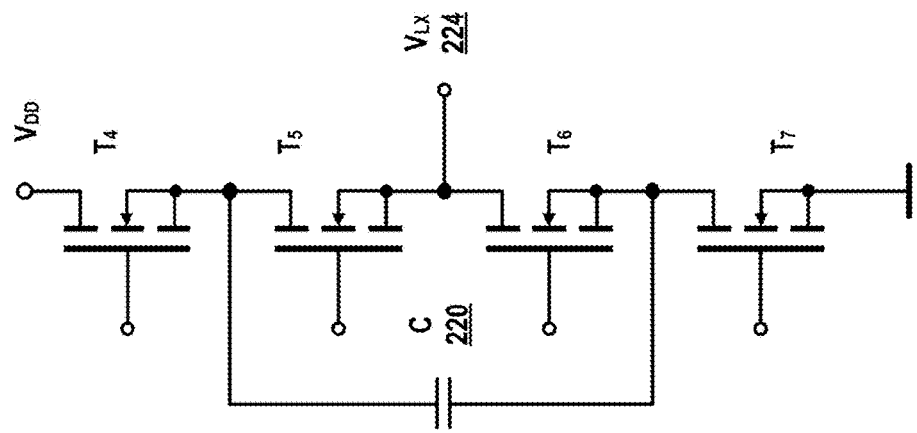
FIG. 2B is a schematic diagram illustrating an example flying capacitor VSC power stage.
Figure 2A:
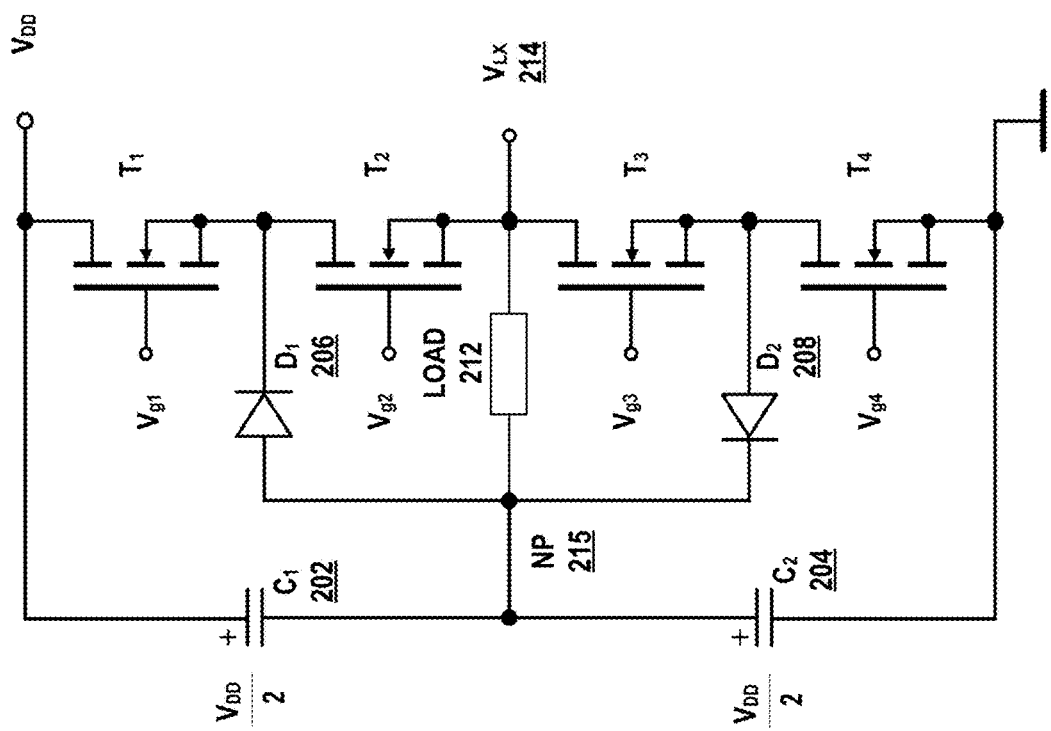
FIG. 2A is a schematic diagram illustrating an example neutral point clamped VSC power stage.

FIG. 2A is a schematic diagram illustrating an example neutral point clamped (NPC) VSC power stage. A neutral point (or diode) clamped power stage is one of several power stages that may be used in multi-level architecture VSC. The NPC power stage example of FIG. 2A includes four transistors (T1-T4) connected in series between Vdd and ground.

An NPC based inverter may generate multiple voltage levels through capacitors (C1 202 and C2 204) and diodes (D1 206 and D2 208) clamped to the neutral or middle point NP 215. This structure can be extended to any number of levels. However, because of neutral node balancing, a three-level NPC configuration may have advantages over more than three levels. Diodes D1 206 and D2 208 are extra passive components placed in the output current path. These passive components may lead to a decrease of the power efficiency to load 212, connected to switching node VLX 214, because of an unwanted voltage drop across the diodes.

In a single-leg topology, single phase variant depicted in FIG. 2A, the three voltage levels (VDD, ½VDD and zero) are obtained by the appropriate driving of the switches T1-T4, and via clamping diodes D1 206 and D2 208. In more detail, the output voltage to load 212 may reach positive VDD while T1 and T2 are simultaneously conducting, whereas a zero voltage level to load 212 occurs during simultaneous conduction of T3 and T4. The output power is delivered by the DC-link capacitors C1 202 and C2 204. A voltage of ½VDD is obtained by simultaneous conduction of transistors T2 and T3. In this case, the output voltage is clamped to the low-impedance neutral point NP via one of the passive diodes D1 206 or D2 208.

While applying this modulation strategy to the sinewave PWM (SPWM) switching scheme, the central transistor T2 remains conductive during entire positive half-period (ΦH) of the output voltage to load 212, whereas gates of T1 and T3 are driven by fast complementary PWM signals. Likewise, generation of the negative half-period (ΦL) of output voltage to load 212 is obtained by continuous conduction of T3, and complementary PWM modulation of T2 and T4 transistors gates. Therefore, for the NPC based inverter, much of the output current is delivered by passive components D1 206, D2 208 and by DC-link capacitor C1 202 and C2 204. The voltage drops on the diodes may involve conversion efficiency loss.

FIG. 2B is a schematic diagram illustrating an example flying capacitor VCS power stage. A flying capacitor power stage is another of several types of power stages that may be used in multi-level architecture VSC. Similar to the NPC structure of FIG. 2A, the circuit of FIG. 2B includes four transistors connected in series between Vdd and ground. Capacitor 220 connects to the node between T4 and T5 and the node between T6 and T7 and does not connect to switching node VLX 224. Capacitor 220 is called a "flying capacitor" because the voltage across capacitor 220 is not tied to a voltage reference. Compared to capacitor C2 204, which has one terminal connected to ground and capacitor C1 202, which has one terminal connected to Vdd, flying capacitor 220 may be isolated from either voltage reference, e.g. when T7 is open and/or when T4 is open.

The flying capacitor structure of FIG. 2B may offer an advantage when compared to the diode-clamped power-stage because the clamping diodes are not present in the output path. A flying capacitor power stage may also include an extra switching state, which allows an ability to regulate the flying capacitor voltage, as well as have phase redundancies available for balancing capacitors' voltage levels and may provide control of the reactive and real power flow. Flying capacitor power stages may have disadvantages including difficult flying capacitor voltage control, a complex startup process, which may lead to poor switching efficiency. Also, capacitors may be more expensive when compared to diodes.

Figure 3:
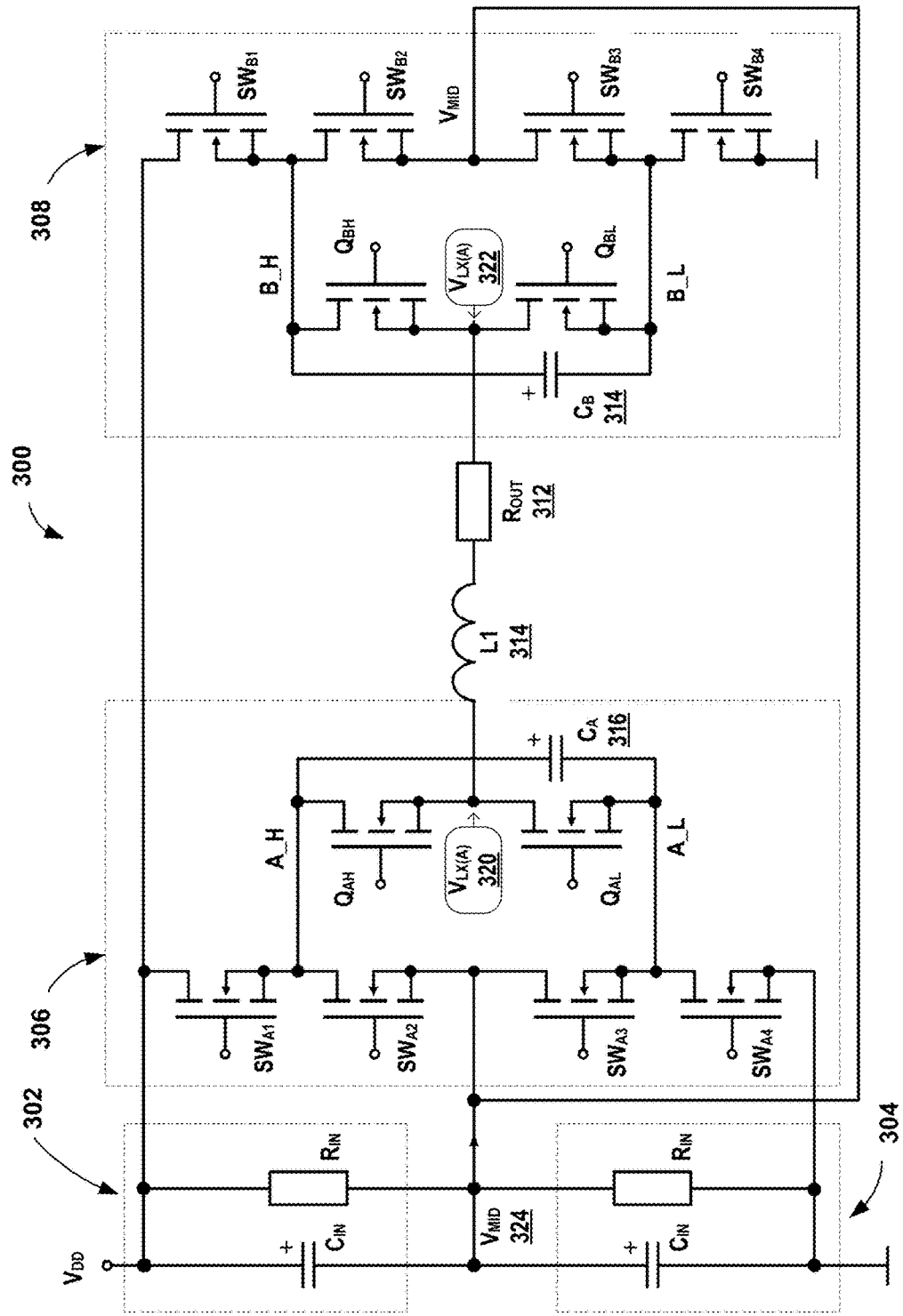
FIG. 3 is a schematic diagram illustrating an example implementation of a power inverter circuit.

FIG. 3 is a schematic diagram illustrating an example implementation of a power inverter circuit. Circuit 300 includes some similar structures to those shown in system 100 depicted in FIG. 1.

Circuit 300 comprises a three-level PWM floating H-bridge sinewave power inverter which may offer advantages when compared to the NPC and flying capacitor approach. Circuit 300 includes an input voltage divider formed by Zhigh 302 and Zlow 304. Circuit 300 also includes two half-bridges 306 and 308 that output current to an output portion, comprising inductor L1 314, which supplies load $R_{OUT}$ 312. Circuit 300 may also include a controller (not shown in FIG. 3) similar to controller 102 described above in relation to FIG. 1.

In the example of circuit 300, Zhigh 302 and Zlow 304 are each implemented with a parallel combination of a capacitor $C_{IN}$ and resistor $R_{IN}$. Similar to the flying capacitor topology of FIG. 2B, each half-bridge 306 and 308 is implemented with four transistors in series connected between Vdd and ground with a capacitor connected across the switching node of each half-bridge 306 and 308. For example, capacitor Ca 316 connects to the node between transistor $SW_{A1}$ and $SW_{A2}$ and to the node between transistor $SW_{A3}$ and $SW_{A4}$. Capacitor Ca 316 connects to switching node $V_{LX(A)}$ 320 through transistors $Q_{AH}$ and $Q_{AL}$. Half-bridge 308 is connected in a similar manner.

In operation, circuit 300 may use a modified switching cycle for half-bridges 306 and 308 when compared to the flying capacitor circuit depicted in FIG. 2B and the NPC circuit depicted in FIG. 2A. Also, circuit 300 may provide inherent balancing of the middle voltage node Vmid 324. However, the topology of FIG. 3 contains twelve transistors. The discharging phase for inductor L1 314 is controlled by passing current through four serially connected transistors. Because this discharge phase occurs during approximately half of the circuit operating time, the result is an Ohmic dissipation caused by the power loss of Ron of the involved transistor (i.e. RDS-ON in the example of MOSFET transistors). The number of components, i.e. mounting twelve power devices may result in an increased implementation cost when compared to other examples.

Figure 4:
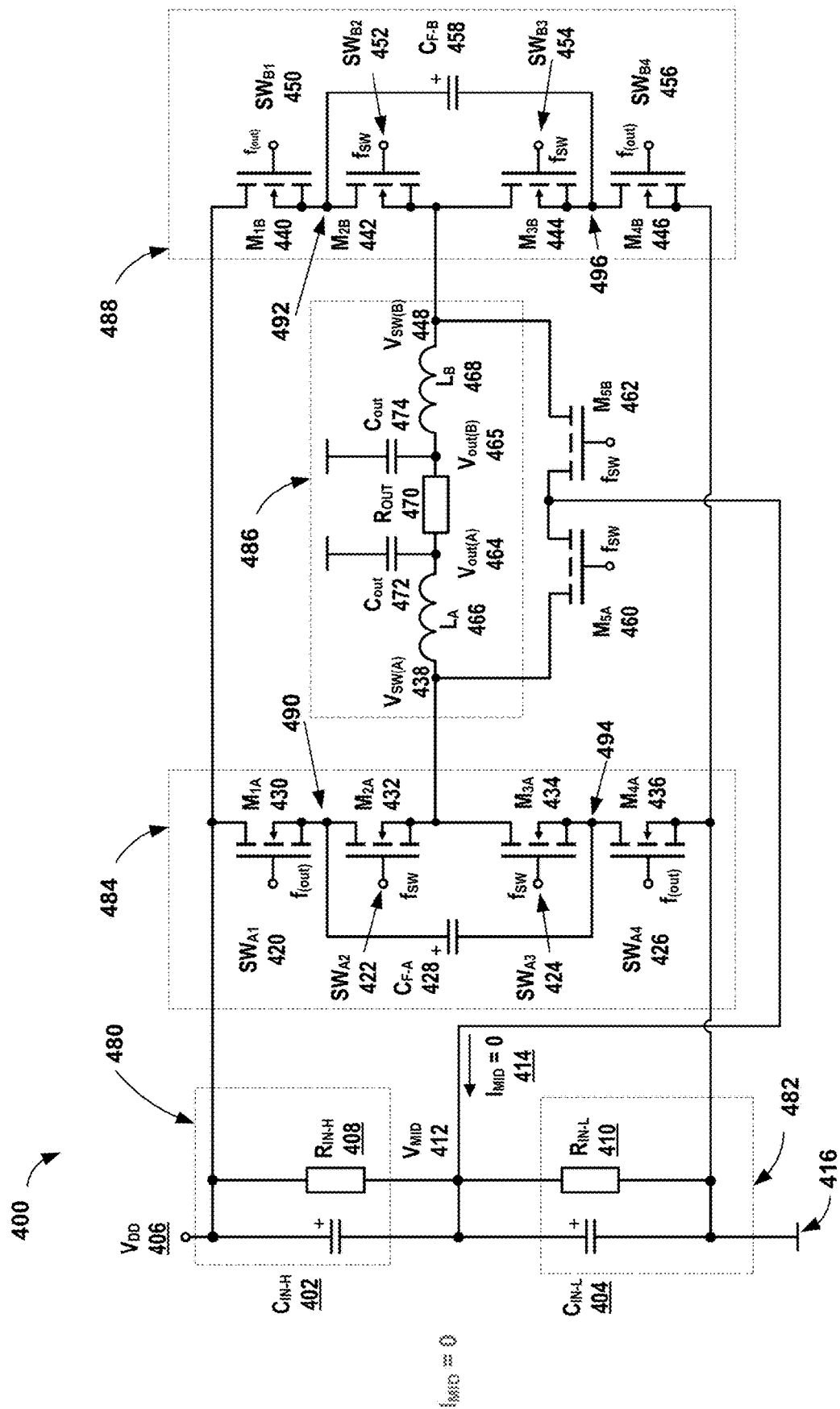
FIG. 4 is a is a schematic diagram illustrating an example implementation of a power inverter circuit according to one or more techniques of this disclosure.

FIG. 4 is a is a schematic diagram illustrating an example implementation of a power inverter circuit according to one or more techniques of this disclosure. Circuit 400 is an example of the power inverter circuit described above in relation to FIG. 1. The configuration of circuit 400 provides a three-level PWM power inverter with improved efficiency from reduced losses as well as fewer active components and without the need for complex control circuit when compared to other examples.

Circuit 400 includes an input voltage divider formed by Zhigh 480 and Zlow 482. System 100 also includes two half-bridges 484 and 488 that output current to output section 486, which supplies load $R_{OUT}$ 470. Switches $M_{5A}$ 460 and $M_{5B}$ 462 alternately connect portions of half bridge 484 and half bridge 488 across the input voltage divider. Circuit 400 may also include a controller (not shown in FIG. 3) similar to controller 102 described above in relation to FIG. 1, which may control the frequency and timing for the switches in circuit 400.

The input voltage divider is a passive voltage divider connected between the DC supply voltage Vdd 406 and a reference voltage, 416, which in the example of FIG. 4 is ground. Vdd 406 may comprise a positive voltage with respect to ground. The high branch of the input voltage divider Zhigh 480 and the low branch of the input voltage divider Zlow 482 are configured to provide a divided voltage Vmid 412. High side impedance Zhigh 480 includes capacitor $C_{IN-H}$ 402 connected in parallel to resistor $R_{IN-H}$ 408 to Vdd 406. Capacitor $C_{IN-H}$ 402 and resistor $R_{IN-H}$ 408 connect to ground 416 through the parallel combination of capacitor $C_{IN-L}$ 404 and resistor $R_{IN-L}$ 410. The capacitance value of $C_{IN-H}$ 402 is approximately equal to the capacitance value of $C_{IN-L}$ 404. Similarly, the resistance value of resistor $R_{IN-H}$ 408 is approximately equal to the resistance value of resistor $R_{IN-L}$ 410. Therefore, in the example of circuit 400, the input voltage divider is configured to provide divided voltage Vmid 412 that is approximately one-half of Vdd 406 and a static current consumption by the resistive divider that is low, e.g. a few microamps. Manufacturing tolerances and process variation may cause small differences in the resistance and capacitance values.

Half-bridge 484 includes four switches connected in series between Vdd 406 and ground 416, $M_{1A}$ 430, $M_{2A}$ 432, $M_{3A}$ 434 and $M_{4A}$ 436. The drain of $M_{1A}$ 430 connects to Vdd 406 and the source of $M_{4A}$ 436 connects to ground 416. In the example of circuit 400 switches $M_{1A}$ 430, $M_{2A}$ 432, $M_{3A}$ 434 and $M_{4A}$ 436 are enhancement type N-channel metal oxide semiconductor field effect transistors (MOSFET). Half-bridge 484 includes capacitor $C_{F-A}$ 428 with one terminal connected to node 490 and a second terminal connected to node 494. Switching node $V_{SW-A}$ 438 connects to the source of $M_{2A}$ 432 and the drain of $M_{3A}$ 434.

Half-bridge 484 may look similar to the flying capacitor arrangement described above in relation to FIG. 2B. However, as will be described in more detail below, capacitor $C_{F-A}$ 428 is used in a different manner than capacitor 202 depicted in FIG. 2B. Also, the switching sequence and frequency of switches $M_{1A}$ 430, $M_{2A}$ 432, $M_{3A}$ 434 and $M_{4A}$ 436 is different from the operation of transistors T4-T7 depicted in FIG. 2B. These differences also allow the capacitance value of $C_{F-A}$ 428 to be significantly less than the capacitance value of capacitor 202.

Similar to half-bridge 484, half-bridge 488 includes four switches connected in series between Vdd 406 and ground 416: $M_{1B}$ 440, $M_{2B}$ 442, $M_{3B}$ 444 and $M_{4B}$ 446. The drain of $M_{1B}$ 440 connects to Vdd 406 and the source of $M_{4B}$ 446 connects to ground 416. In the example of circuit 400 switches $M_{1B}$ 440, $M_{2B}$ 442, $M_{3B}$ 444 and $M_{4B}$ 446 are also enhancement type N-channel MOSFETs. Half-bridge 488 includes capacitor $C_{F-B}$ 458 with one terminal connected to node 492 and a second terminal connected to node 496. The use of capacitor $C_{F-B}$ 458 is similar to that described above for capacitor $C_{F-A}$ 428. Switching node $V_{SW-B}$ 448 connects to the source of $M_{2B}$ 442 and the drain of $M_{3B}$ 444. The operation of switches $M_{1B}$ 440, $M_{2B}$ 442, $M_{3B}$ 444 and $M_{4B}$ 446 are also the same as described above for half-bridge 484, except that the switches in half-bridge 488 operate in a complementary manner to the switches in half-bridge 484, as will be described in more detail below. Half bridge 484 and half bridge 488 form a symmetrical H-bridge circuit.

The switching node $V_{SW-A}$ 438 of half bridge 484 and switching node $V_{SW-B}$ 448 of half bridge 488 connect to output section 486. Output section 486 supplies AC power to load Rout 470, where load Rout 470 may be any type of load, such as a motor, AC powered appliances, and similar loads. Output section 486 includes two low-pass filter circuits. A first low-pass filter circuit includes inductor La 466 and Cout 472. A second low-pass filter includes inductor Lb 468 and Cout 474. Inductor La 466 connects switching node $V_{SW-A}$ 438 to load Rout 470 and Cout 472 connects inductor La 466 and load $R_{OUT}$ 470 to ground. Inductor Lb 468 connects switching node $V_{SW-B}$ 448 to load Rout 470 and Cout 474 connects inductor Lb 468 and load $R_{OUT}$ 470 to ground.

The connection between each low pass filter and the load may be considered an output element. Output element Vout-a 464 connects the low-pass filter of La 466 and Cout 472 to Rout 470. Output element Vout-b 465 connects the low-pass filter of Lb 468 and Cout 474 to Rout 470. In other words, output element Vout-a 464 connects to the switching node $V_{SW-A}$ 438 through a LC low-pass filter and output element Vout-b 465 connects to the switching node $V_{SW-B}$ 448 through a second LC low-pass filter.

Switch $M_{5A}$ 460 connects $V_{MID}$ 412 to switching node $V_{SW-A}$ 438. Switch $M_{5B}$ 462 connects $V_{MID}$ 412 to switching node $V_{SW-B}$ 448. Switches $M_{5A}$ 460 and $M_{5B}$ 462 in the example of circuit 400 may be bidirectional switches because at different phases in the operation, explained in more detail below, the drain/source terminals of switches $M_{5A}$ 460 and $M_{5B}$ 46 may alternately be connected to a positive ($+V_{DD}/2$) and negative ($-V_{DD}/2$) voltage.

As a brief summary of operation, transistors $M_{1A}$ 430, $M_{4A}$ 436, $M_{1B}$ 440 and $M_{4B}$ 446 are switched at the desired output frequency, $f_{OUT}$, of the AC output power. In some examples, the desired output frequency, $f_{OUT}$, may be 50 Hz, 60 Hz, or some other frequency. For example, in portions of Europe and Japan, the frequency of the AC power grid is 50 Hz, and appliances, motors and other AC loads are configured to run at 50 Hz. In other locations, such as parts of North America, the desired output frequency is 60 Hz. The slow switching frequency $f_{OUT}$, is shown at the gates of the slow switching transistors, i.e. $SW_{A1}$ 420, $SW_{A4}$ 426, $SW_{B1}$ 450 and $SW_{B4}$ 456. The phase of the switching control signal between half bridge 484 and half bridge 488 is complementary. That is, the control signal to $SW_{A1}$ 420 is complementary to $SW_{B1}$ 450 and $SW_{A4}$ 426 is complementary to $SW_{B4}$ 456, though both sets of signals are at approximately $f_{OUT}$. The control signals may be generated by control circuitry similar to controller 102 described above in relation to FIG. 1.

Transistors $M_{2A}$ 432, $M_{3A}$ 434, $M_{2B}$ 442 and $M_{3B}$ 444 are used to set the desired AC output voltage and may be switched at a much higher switching frequency, $f_{SW}$, when compared to $f_{OUT}$. In other words, transistors $M_{2A}$ 432, $M_{3A}$ 434, $M_{2B}$ 442 and $M_{3B}$ 444 configured to set a magnitude of the output voltage based on PWM. The output voltage may also be referred to as the line output voltage in this disclosure. In some examples, $f_{SW}$ may be in the tens or hundreds of kilohertz (kHz). As with the slow switching devices, the phase of the switching control signal between half bridge 484 and half bridge 488 is complementary. The bidirectional switches $M_{5A}$ 460 and $M_{5B}$ 462 may also switch at the higher switching frequency, $f_{SW}$. The fast switching frequency $f_{SW}$, is shown at the gates of the fast switching transistors, i.e. $SW_{A2}$ 422, $SW_{A3}$ 424, $SW_{B2}$ 452, $SW_{B3}$ 454 as well as the gates of switches $M_{5A}$ 460 and $M_{5B}$ 462.

In contrast to the switching scheme for the NPC power stage depicted in FIG. 2A, the slow switching transistors $M_{1A}$ 430, $M_{4A}$ 436, $M_{1B}$ 440 and $M_{4B}$ 446 are connected to the power supply rails ($V_{DD}$ 406 and ground 416). Connecting the slow switching transistors to the power supply rails considerably simplifies the generation of the control signals to the switch gates. Secondly, switching with low frequency eliminates dynamic switching losses of these transistors, so that only Ohmic, i.e. conduction, power losses of the slow switching transistors may be considered a factor in the efficiency of circuit 400.

The fast switching transistors may contribute switching losses to the efficiency of circuit 400. In the example of a MOSFET, as the MOSFET switches on and off, its intrinsic parasitic capacitance stores and then dissipates energy during each switching transition. The losses are proportional to the switching frequency and the values of the parasitic capacitances (i.e. loss=$\frac{1}{2}C \times V^2 \lambda f_{SW}$). As the physical size of the MOSFET increases, the conduction loss may be reduced, but the MOSFET capacitance also increases, so increasing MOSFET size may also increases switching loss. However, the switching loss for the fast switching devices $M_{2A}$ 432, $M_{3A}$ 434, $M_{2B}$ 442 and $M_{3B}$ 444 is mitigated by the topology of circuit 400 because the drain-source voltage of the fast switching devices is held to only half the $V_{DD}$ 406 voltage. Therefore, the switching losses may be reduced by 25% or more.

The topology of the circuit in system 100, an example of which is depicted in FIG. 4, may have advantages over other power inverter topologies. For example, unlike the NPC example of FIG. 2A, in which the compensation of the middle node is managed by inserting extra circuit elements, such as diodes, the circuit of this disclosure does not need extra diodes or capacitors. Also, unlike the example of FIG. 3, in which the compensation of the middle node is managed with an extra switching phase, which may tradeoff neutral node compensation with some reduced efficiency, the control scheme for the circuit of this disclosure is simplified. Also, the generated output voltage Vout=VLOAD=Vout-a 464−Vout-b 465 reaches three voltage levels: 0 and ±VDD 406. This technique offers previously mentioned advantage of inductor current and output voltage ripple reduction as well as the switches in circuit 400 may only be subjected to a drain-source voltage of ½VDD 406. A reduction of the drain-source voltage (VDS) for transistors in the circuit may advantageously allow either to enlarge the choice of the switching devices, e.g. to be able to use transistors with a lower RDS-ON specification and therefore reduced conduction loss, or to increase the power supply voltage of VDD 406.

FIGS. 5A-5D are schematic diagrams illustrating example phases of a power inverter circuit operation according to one or more techniques of this disclosure. The circuit operation depicted by FIGS. 5A-5D are examples of different phases of operation of circuit 400 described above in relation to FIG. 4 and describe the switching scheme in more detail. To simplify the description and the figures, some of the reference numbers have been removed from FIGS. 5A-5D. For clarity, $C_{IN-H}$ corresponds to $C_{IN-H}$ 402, $M_{1A}$ corresponds to $M_{1A}$ 430, $M_{5A}$ corresponds to $M_{5A}$ 460, $M_{5B}$ corresponds to $M_{5B}$ 462. $M_{1B}$ corresponds to $M_{1B}$ 440 and so on (Also see Table 1). The LC filters in output section 486 depicted in FIG. 4 have been replaced with LPF 504 and LPF 506 in FIGS. 5A-5D. In the example of FIGS. 5A-5D, the supply voltage is 400V, one-half the supply voltage is 200V and the desired AC output frequency is 50 Hz. These values are just to simplify and clarify the explanation. In other examples, the supply voltage may be different value and the desired AC output frequency may be a different value, as described above in relation to FIG. 4. FIGS. 5A-5D correspond to the described phases A-D, in which phases A and C (FIGS. 5A and 5C) may be considered accumulation phases for the LC filters, LPF 504 and LPF 506. Phases B and D (FIGS. 5B and 5D) may be considered discharging phases. The switching during phases A and C are complementary and the switching between phases B and D are complementary.

Figure 5A:
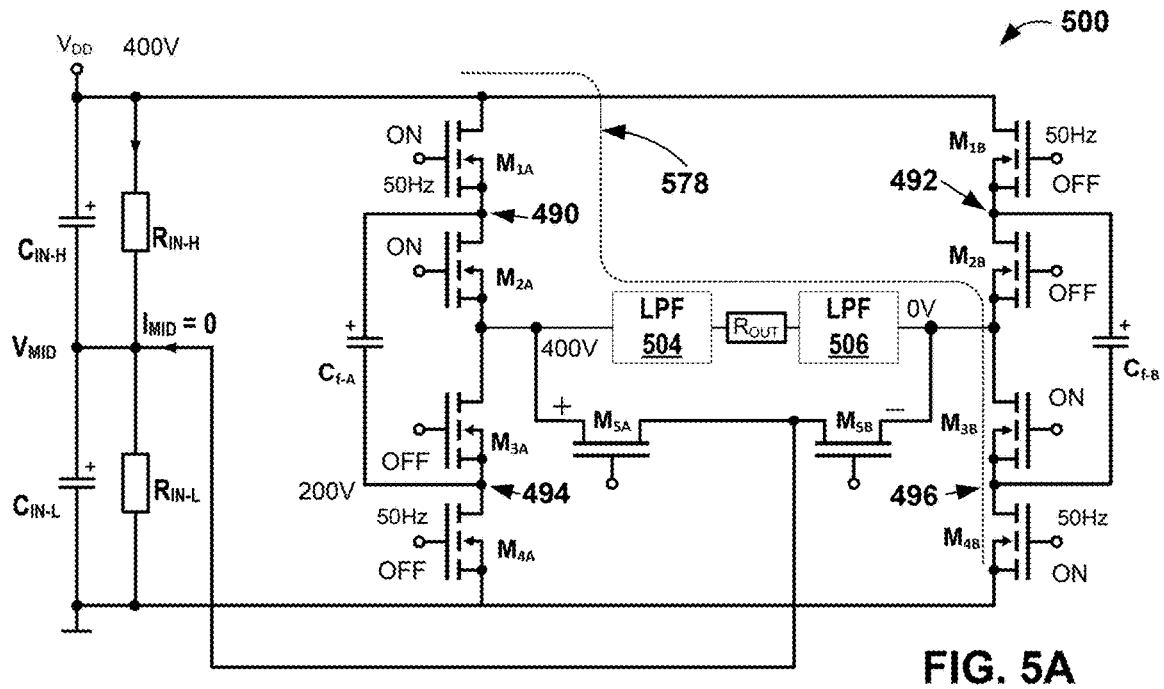
FIGS. 5A-5D are schematic diagrams illustrating example phases of a power inverter circuit operation according to one or more techniques of this disclosure.

FIG. 5A depicts phase A, in which the power to the load current 578 is delivered from $V_{DD}$ via $M_{1A}$ and $M_{2A}$. The current flows to ground via $M_{3B}$ and $M_{4B}$ (shown by the symbols ON at the gates of $M_{1A}$, $M_{2A}$, $M_{3B}$ and $M_{4B}$), and in table 1. During phase A, the higher terminal 490 of $C_{F-A}$ is connected to $V_{DD}$ via $M_{1A}$. The lower terminal of $C_{F-A}$ (494) is connected to mid-node of the transistors $M_{3A}$ and $M_{4A}$. The transistors of circuit 400, as shown in FIG. 5A, sustain maximum voltage $\frac{1}{2}V_{DD}$ (200V). However, because the voltage across $C_{F-A}$, i.e. $V(C_{F-A})=\frac{1}{2}V_{DD}$, then during the phase A, the mid-node of $M_{3A}$ and $M_{4A}$ (494) is biased at $\frac{1}{2}V_{DD}$. Therefore, each of $M_{3A}$ and $M_{4A}$ have a drain-source voltage of $\frac{1}{2}V_{DD}$. Both $M_{5A}$ and $M_{5B}$ are OFF and not conducting, therefore the current from the input divider, $I_{MID}$, is approximately zero. $I_{MID}$ in FIGS. 5A-5D corresponds to $I_{MID}$ 414 depicted in FIG. 4.

TABLE 1

Circuit Switching Operation

| | FIG. 4 Ref. | 5A | 5B | 5C | 5D |
|---|---|---|---|---|---|
| $M_{1A}$ | 430 | ON | ON | OFF | OFF |
| $M_{2A}$ | 432 | ON | OFF | OFF | ON |
| $M_{3A}$ | 434 | OFF | ON | ON | OFF |
| $M_{4A}$ | 436 | OFF | OFF | ON | ON |
| $M_{1B}$ | 440 | OFF | OFF | ON | ON |
| $M_{2B}$ | 442 | OFF | ON | ON | OFF |
| $M_{3B}$ | 444 | ON | OFF | OFF | ON |
| $M_{4B}$ | 446 | ON | ON | OFF | OFF |
| $M_{5A}$ | 460 | OFF | ON | OFF | ON |
| $M_{5B}$ | 462 | OFF | ON | OFF | ON |
| $V_{SW(A)}$ | 438 | $V_{DD}$ | $V_{MID}$ | $V_{SS}$ | $V_{MID}$ |
| $V_{SW(B)}$ | 448 | $V_{SS}$ | $V_{MID}$ | $V_{DD}$ | $V_{MID}$ |
| $V_{HIGH-A}$ | 490 | $V_{DD}$ | $V_{MID}$ | $\sim\frac{1}{2}V_{DD}$ | $V_{MID}$ |
| $V_{LOW-A}$ | 494 | $\sim\frac{1}{2}V_{DD}$ | $V_{SS}$ | $V_{SS}$ | $V_{SS}$ |
| $V_{HIGH-B}$ | 492 | $\sim\frac{1}{2}V_{DD}$ | $V_{DD}$ | $V_{DD}$ | $V_{DD}$ |
| $V_{LOW-B}$ | 496 | $V_{SS}$ | $V_{MID}$ | $\sim\frac{1}{2}V_{DD}$ | $V_{MID}$ |
| $V_{CFA}$ | 428 | $\sim\frac{1}{2}V_{DD}$ | $V_{CIN-HIGH}$ | $\sim\frac{1}{2}V_{DD}$ | $V_{CIN-LOW}$ |
| $V_{CFB}$ | 458 | $\sim\frac{1}{2}V_{DD}$ | $V_{CIN-LOW}$ | $\sim\frac{1}{2}V_{DD}$ | $V_{CIN-HIGH}$ |

Figure 5B:
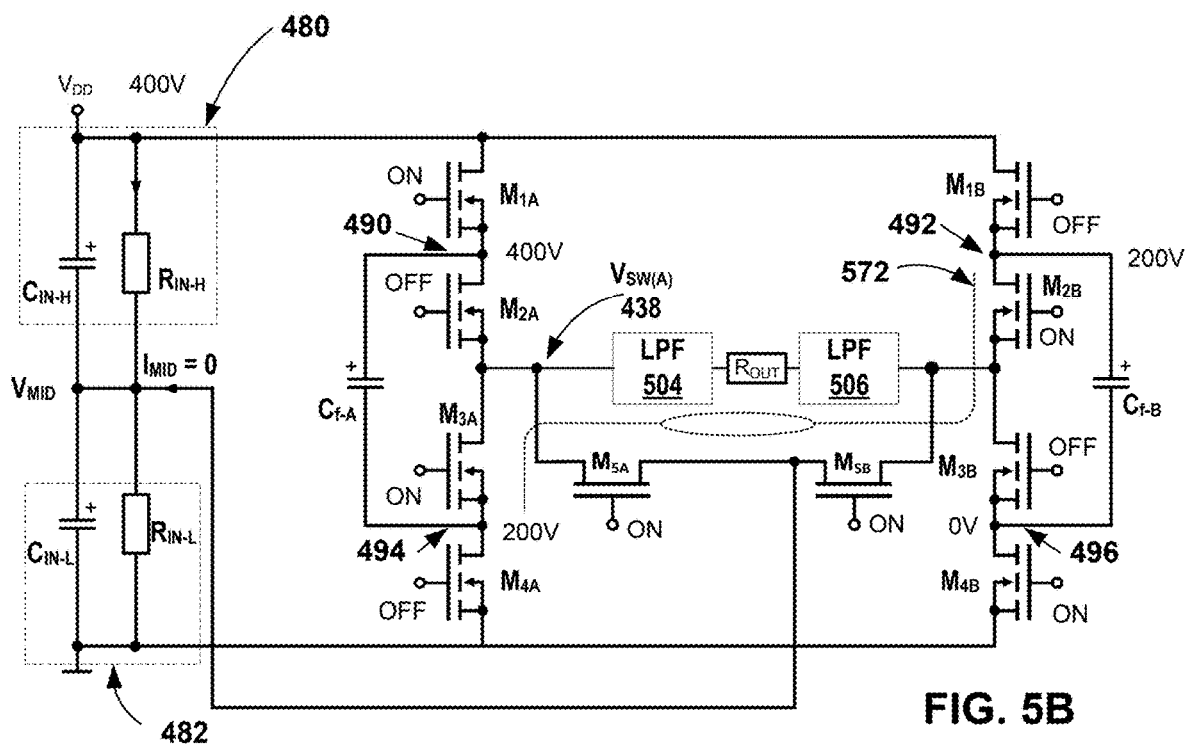

FIG. 5B depicts phase B, in which $M_{5A}$ and $M_{5B}$ are conducting. This type of switching can result in a decrease of the magnetic energy in the output coils, i.e. a discharge phase. In other words, the coils of LPF 504 and LPF 506, respectively inductor La 466 and inductor Lb 468 depicted in FIG. 4, are discharging during phase B. During this time, though $M_{5A}$ and $M_{5B}$, as well as $M_{3A}$ and $M_{2B}$ connect the divided input voltage $V_{MID}$ to the switching nodes, the current from the input divider, $I_{MID}$, is approximately zero. A nonzero current occurs, when the voltage across $C_{IN-H}$ 402 and $C_{IN-L}$ 404 are unequal. For this case, the capacitor $C_{F-A}$ and $C_{F-B}$ are continuously compensating this error, by transferring the charge between $C_{IN-H}$ and $C_{IN-L}$. Advantageously, only two devices are in series in FIG. 5B during phase B and therefore there are only two drain-source voltage drops that may impact the power efficiency.

As shown by the current line 572, the mid-node voltage 494 is connected by $M_{5A}$ to middle point $V_{MID}$ of resistive-capacitive input divider. As the middle point $V_{MID}$ is ideally at $\frac{1}{2}V_{DD}$ voltage, the $M_{2A}$-$M_{3A}$ connection, i.e. switching node $V_{SW-A}$ 438, is held to $\frac{1}{2}V_{DD}$ voltage. Also, because $M_{3A}$ is ON, the drain of $M_{4A}$ drain is also at $\frac{1}{2}V_{DD}$ voltage (i.e. 200V in the example of FIG. 5B) and because $M_{1A}$ is ON, high-side terminal 490 of $C_{F-A}$ is at $V_{DD}$ voltage (i.e. 400V in the example of FIG. 5B). In other words, during phase B, $C_{F-A}$ is connected across Zhigh 480 and $C_{F-B}$ is connected across Zlow 482. Therefore, as shown in Table 1, the voltage across $C_{F-A}$ i.e. $V(C_{F-A})$ is equalized to the voltage across the parallel combination of $C_{IN-H}$ 402 and $R_{IN-H}$ 408 as depicted in FIG. 4, i.e. $V(C_{IN-H})$. Similarly, the voltage across $C_{F-B}$ i.e. $V(C_{F-B})$ is equalized to the voltage across the parallel combination of $C_{IN-L}$ 404 and $R_{IN-L}$ 410 as depicted in FIG. 4, i.e. $V(C_{IN-L})$.

Figure 5C:
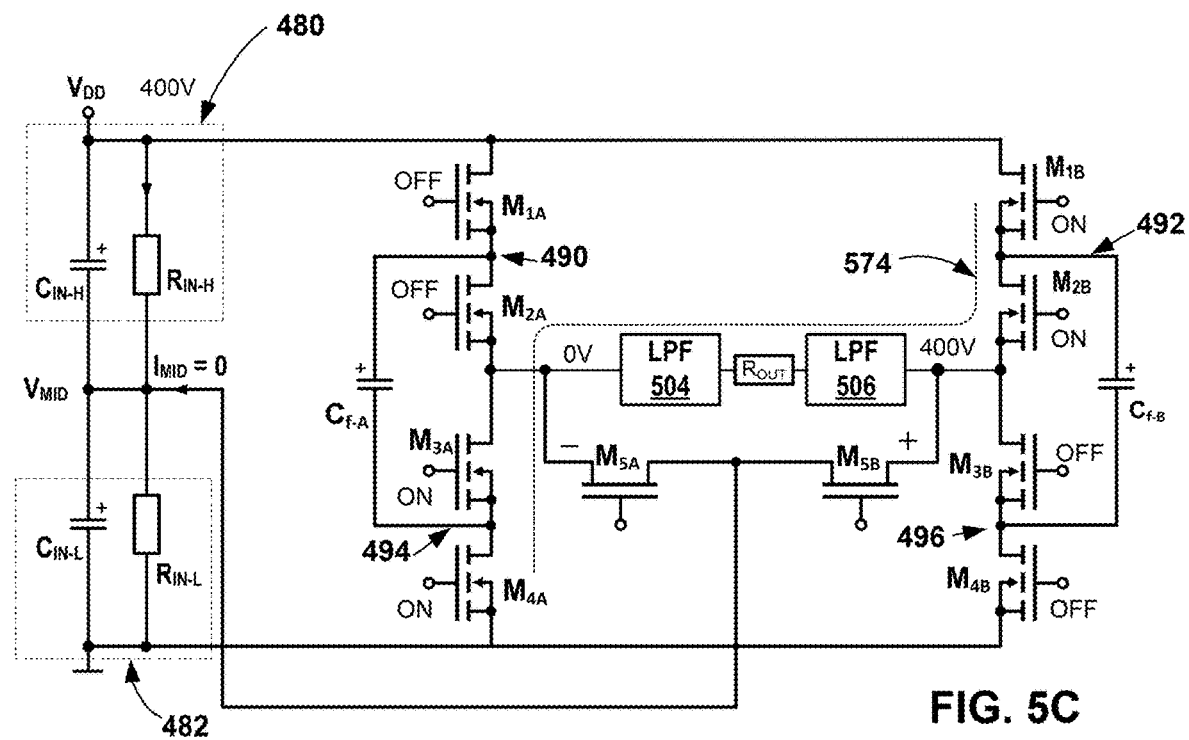

FIG. 5C depicts phase C, which is complementary to phase A, described above in relation to FIG. 5A. In FIG. 5C, the power to the load current 574 is delivered from $V_{DD}$ via $M_{1B}$ and $M_{2B}$. The current 574 flows to ground via $M_{3A}$ and $M_{4A}$ (shown by the symbols ON at the gates of $M_{1B}$, $M_{2B}$, $M_{3A}$ and $M_{4A}$), as well as in Table 1. During phase C, the higher terminal 492 of $C_{F-B}$ is connected to $V_{DD}$ via $M_{1B}$. The lower terminal of $C_{F-B}$ (496) is connected to mid-node of the transistors $M_{3B}$ and $M_{4B}$. As described above in relation to FIG. 5A, the switches of circuit 400, as shown in FIG. 5C, sustain maximum voltage $\frac{1}{2}V_{DD}$ (200V). However, because the voltage across $C_{F-B}$, i.e. $V(C_{F-B})=\frac{1}{2}V_{DD}$, then during the phase C, the mid-node of $M_{3B}$ and $M_{4B}$ (496) is biased at $\frac{1}{2}V_{DD}$. Therefore, each of $M_{3B}$ and $M_{4B}$ have a drain-source voltage of $\frac{1}{2}V_{DD}$. As with phase A, both $M_{5A}$ and $M_{5B}$ are OFF and not conducting, therefore the current at the input divider, $I_{MID}$, is approximately zero.

Figure 5D:
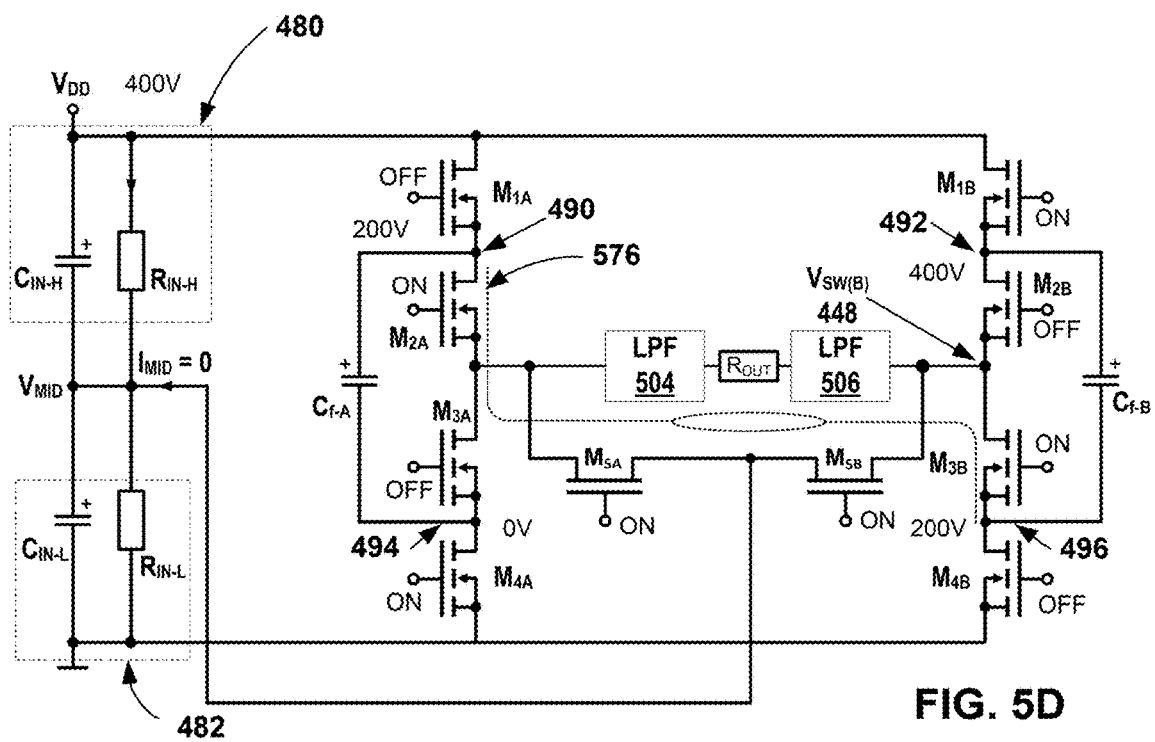

FIG. 5D depicts phase D, which is complementary to phase B, described above in relation to FIG. 5B. In the example of FIG. 5D, $M_{5A}$ and $M_{5B}$ are conducting, which creates a decrease of the magnetic energy in the output coils of LPF 504 and LPF 506, i.e. a discharge phase. Phase D occurs near the phase shift point of the AC output power. During the phase shift, though $M_{5A}$ and $M_{5B}$, as well as $M_{2A}$ and $M_{3B}$ connect the divided input voltage $V_{MID}$ to the switching nodes, the current from the input divider, $I_{MID}$, is approximately zero. Advantageously, only two devices are in series in FIG. 5D during phase D.

As shown by the current line 576, the mid-node voltage 490 is now connected by $M_{5A}$ to middle point $V_{MID}$ of resistive-capacitive input divider. As the middle point $V_{MID}$ is ideally at $\frac{1}{2}V_{DD}$ voltage, the result is: (a) the $M_{2B}$-$M_{3B}$ connection, i.e. switching node $V_{SW-A}$ 448, is held to $\frac{1}{2}V_{DD}$ voltage, (b) because $M_{3B}$ is ON, the drain of $M_{4B}$ drain is also at $\frac{1}{2}V_{DD}$ voltage (i.e. 200V in the example of FIG. 5D), and (c) because $M_{1B}$ is ON, high-side terminal 492 of $C_{F-B}$ is at $V_{DD}$ voltage (i.e. 400V in the example of FIG. 5D). In other words, during phase D, $C_{F-A}$ is connected across Zlow 482 and $C_{F-B}$ is connected across Zhigh 480. Therefore, as shown in Table 1, the voltage across $C_{F-B}$ i.e. $V(C_{F-B})$ is equalized to the voltage across the parallel combination of $C_{IN-H}$ 402 and $R_{IN-H}$ 408 as depicted in FIG. 4, i.e. $V(C_{IN-H})$ or V(Zhigh). Similarly, the voltage across $C_{F-A}$ i.e. $V(C_{F-A})$ is equalized to the voltage across the parallel combination of $C_{IN-L}$ 404 and $R_{IN-L}$ 410 as depicted in FIG. 4, i.e. $V(C_{IN-L})$ or V(Zlow).

The topology and switching scheme, described above in relation to FIGS. 4-5D, may result in several advantages. As described above, the passive input voltage divider may create $\frac{1}{2}V_{DD}$ while the power inverter is not switching, i.e.

in an off state. However, in some examples, as described above in relation to FIG. 4, component variation and manufacturing tolerances may cause the input voltage divider of Zhigh 480 and Zlow 482 to be unbalanced during switching operation. In other words, in examples in which the input voltage divider formed by the parallel combination of $R_{IN-H}$ 408 and $C_{IN-H}$ 402 compared to $R_{IN-L}$ 410 and $C_{IN-L}$ 404 is unbalanced, then the middle voltage $V_{MID}$ 412 may not be equal to one half the input voltage $V_{DD}$ 406 ($V_{MID} \neq \frac{1}{2}V_{DD}$). The switching scheme of circuit 400 causes the flying capacitor for each half-bridge to be alternately connected across each branch of the input voltage divider at a frequency of $f_{OUT}$, the desired output frequency. In other words, the controller circuitry, such as controller 102 described above in relation to FIG. 1, may connect, via the first switch $M_{5A}$ 460, the first capacitor $C_{F-A}$ 428 across a high branch 480 of the input voltage divider and connect, via the second switch $M_{5B}$ 462, a second capacitor $C_{F-B}$ 458 across a low branch 482 of the input voltage divider during a first time period. During a second time period different from the first time period, the controller is further configured to connect, via the first switch $M_{5A}$ 460, the first capacitor $C_{F-A}$ 428 across the low branch 482 of the input voltage divider and connect, via the second switch $M_{5B}$ 462, the second capacitor $C_{F-B}$ 458 across the high branch 480 of the input voltage divider.

Therefore, the transfer charge of $C_{F-A}$ and $C_{F-B}$ is continuously providing equilibration of the voltage across each branch of the input voltage divider with frequency $f_{OUT}$. This allows the input divider to be realized with high value of resistors $R_{IN}$, resulting in negligible current driven from $V_{DD}$. Said otherwise, low impedance of node $V_{MID}$ is ensured by low and high-side capacitors $C_{IN-H}$ 402 and $C_{IN-L}$ 404, of which the voltage is continuously equilibrated by charge transfer ensured by the half bridge capacitors $C_{F-A}$ 428 and $C_{F-B}$ 458. In this manner, the switching scheme and topology of circuit 400 causes the neutral point voltage $V_{MID}$ 412 is always accurately $\frac{1}{2}V_{DD}$, which causes circuit 400 to generate accurate 3-level PWM output signals. The topology and switching scheme of circuit 400 has a further advantage of causing accurate control of all high-impedance nodes in the structure of circuit 400, which is desirable for the reliability of the switching devices, because the circuit components may be kept below the specified voltage tolerance, e.g. the component maximum voltage rating. Also, by use of lower voltage tolerance devices and a reduced drain depletion region, these switches of circuit 400 may present lower parasitic capacitance and on-resistance compared to other power inverters. As a result, the dissipated heat may be low, which enables low-volume realization, suitable e.g. for portable and mobile PV (photovoltaic) applications. Another advantage is the half bridge capacitors $C_{F-A}$ 428 and $C_{F-B}$ 458 may be a small value of capacitance, when compared to other examples of power inverter topologies. In this disclosure, capacitors $C_{F-A}$ 428 and $C_{F-B}$ 458 may be referred to as a flying capacitor, toggling capacitor or charge balancing capacitor.

Figure 6A:
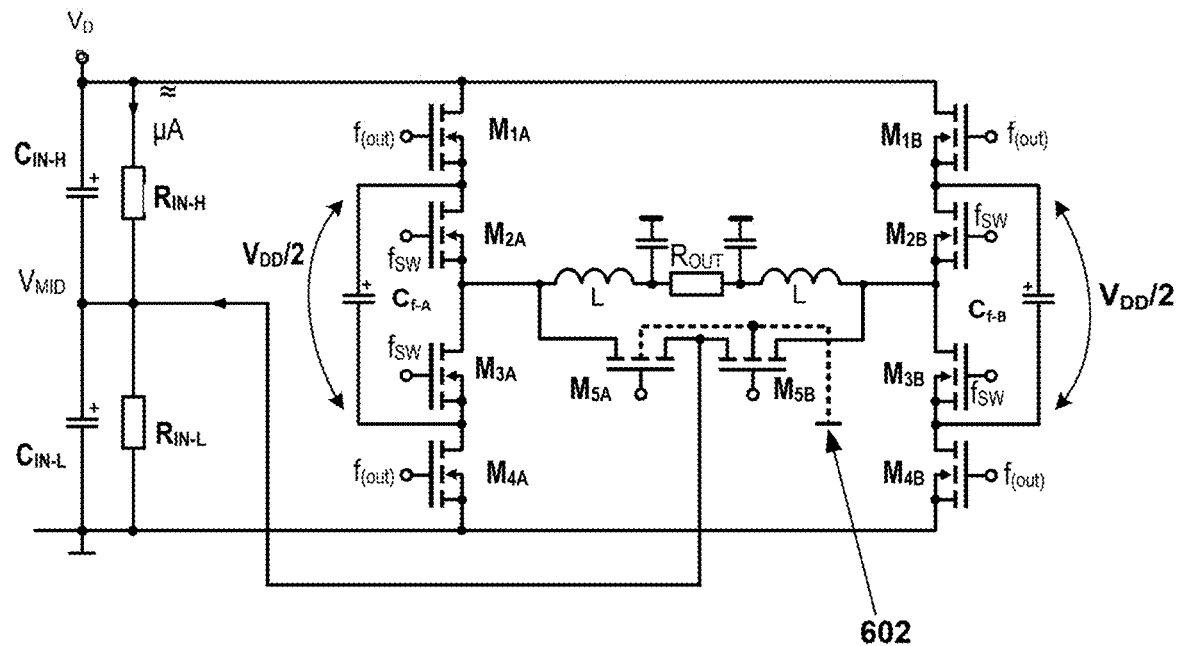
FIGS. 6A-6B are schematic diagrams illustrating examples of a bidirectional transistor according to one or more techniques of this disclosure.
Figure 6B:
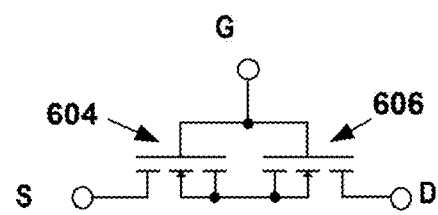

FIGS. 6A-6B are schematic diagrams illustrating examples of a bidirectional transistor according to one or more techniques of this disclosure. As described above in relation to FIGS. 5A and 5C, during phase A and phase C switches $M_{5A}$ and $M_{5B}$ are maintained OFF. However, the drain source terminals of switches $M_{5A}$ and $M_{5B}$ may alternately be connected to positive ($+\frac{1}{2}V_{DD}$) in phase A, and negative ($-\frac{1}{2}V_{DD}$) voltage in phase C. Therefore, a bi-directional off-capability may be desirable for switches $M_{5A}$ and $M_{5B}$.

In some examples, switches $M_{5A}$ and $M_{5B}$ may be realized by a bi-directional switch as one of a class of elements for example, as an arrangement of semiconductor layers on common substrate (not shown in FIGS. 6A and 6B). Some examples of bi-directional switches may require a third terminal to control the substrate biasing. In other examples a fully autonomous switch with independent self-substrate bias control may be used. Some examples of a fully autonomous bidirectional switch may be implemented using gallium-nitride (GaN) high-bandgap voltage technology (not shown in FIGS. 6A and 6B).

Another example of an implementation of bi-directional feature is depicted in FIG. 6A. FIG. 6A is an example of circuit 400, described above in relation to FIG. 4 and the components and topology of the circuit of FIG. 6A is the same as circuit 400. The example of FIG. 6A depicts bulk to ground connection for switches $M_{5A}$ and $M_{5B}$, which may also be implemented as dynamic bulk biasing. As shown in FIG. 6A, the bulk connection of switches $M_{5A}$ and $M_{5B}$ are each connected to ground 602. A bulk to ground connection may be suitable for CMOS process, where the bulk terminal can be isolated. However, CMOS processes may limit the circuit of FIG. 6A to lower voltage range. Optionally, dynamic switching of the substrate between ground 602 and $V_{MID}$ node voltage can also be implemented.

FIG. 6B is a schematic diagram that depicts an example of back-to-back connection of two power MOSFETS. A back-to-back connection of the source of transistor 606 to the source of transistor 604 is one implementation of a fully-symmetrical, i.e. bidirectional, transistor. A drawback to the back-to-back implementation for FIG. 400 is that two more devices are needed, which increases the active switch count to twelve devices. Also, because each of $M_{5A}$ and $M_{5B}$ are actually two transistors in series, the connection between $V_{MID}$ connect $V_{MID}$ to each capacitor of each half bridge during phases B and D, as described above in relation to FIGS. 5B and 5D. Therefore, the implementation of FIG. 6B results in three drain-source voltage drops that may impact the voltage at each half bridge capacitor during phases B and D.

Figure 7:
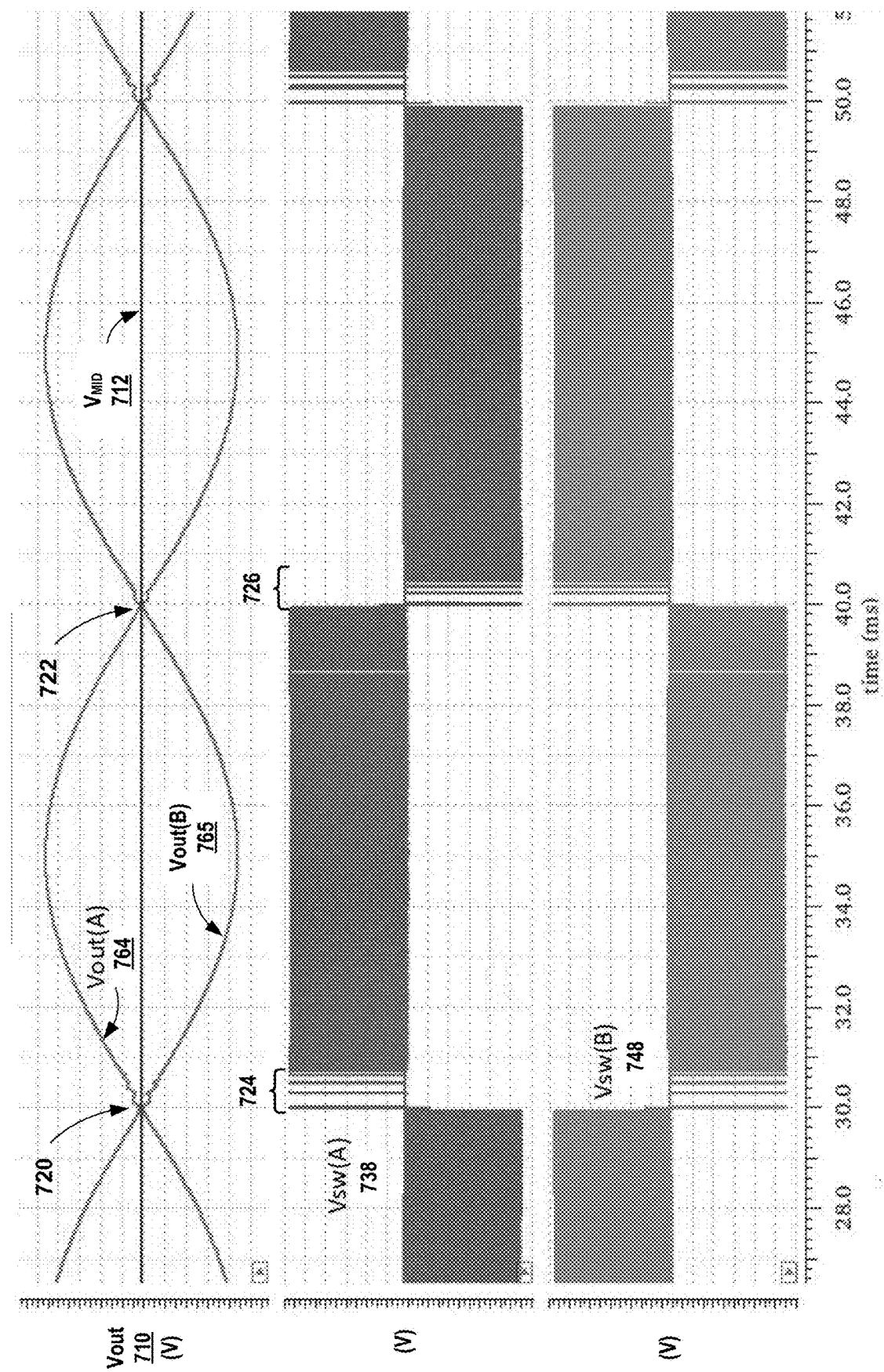
FIG. 7 is timing diagrams illustrating example switching waveforms during operation of a power inverter circuit according to one or more techniques of this disclosure.

FIG. 7 is timing diagrams illustrating example switching waveforms during operation of a power inverter circuit according to one or more techniques of this disclosure. FIG. 7 illustrates a graphic example of the circuit operation as described above in relation to FIGS. 4-5D and show the controlled voltages for the switches of circuit 400, which allow reliable use of low voltage power switches. FIG. 7 will be described in terms of FIGS. 4-5D, unless otherwise noted.

The topmost diagram illustrates the output voltage Vout 710, which corresponds to the output voltage to load $R_{OUT}$ 470 depicted in FIG. 4. The output voltage to load $R_{OUT}$ 470 is the difference between voltages at output element Vout-a 464 and output element Vout-b 465. The voltage curve Vout(A) 764 corresponds to the voltage at output element Vout-a 464. Voltage curve Vout(B) 765 corresponds to the voltage at output element Vout-b 465. Output voltage diagram Vout 710 also includes two phase transition points 720 and 722. Voltage curve Vout(A) 764 and voltage curve Vout(B) 765 depict the desired output frequency $f_{OUT}$. Switching node voltage curve Vsw(A) 738 and switching node voltage curve Vsw(B) 748 depict the fast switching and voltage at switching nodes $V_{SW-A}$ 438 and $V_{SW-B}$ 448 respectively.

In some examples, bidirectional switches $M_{5A}$ 460 and $M_{5B}$ 462 may have a finite ON-resistance. The finite ON-resistance (e.g. $R_{DS-ON}$) may result in a small voltage drop on each of switches $M_{5A}$ 460 and $M_{5B}$ 462. The small voltage drop may be symmetrically mirrored between capacitor $C_{F-A}$ 428 and capacitor $C_{F-B}$ 458 (i.e. V($C_{F-A}$)=V ($C_{F-B}$)). The small voltage drop may cause, for example some hundreds of millivolts (mV) of the symmetrical voltage fluctuation on each of $C_{F-A}$ 428 and capacitor $C_{F-B}$ 458 during operation. However, while phase shift between output voltage and output current to load $R_{OUT}$ 470 may be close to zero degrees (0°), during the phase switching, i.e. at phase transitions 720 and 722, the output current is close to zero. This makes the voltage fluctuation negligible for the $V_{MID}$ 412 voltage. Said otherwise, if the voltage fluctuation ΔV(Cf) can be in order of I_OUT·R_ON (M5), then the voltage fluctuation may be nearly zero during the phase transition, where ΔV(Cf) applies to either of capacitor $C_{F-A}$ 428 and capacitor $C_{F-B}$ 458 and RON (M5) applies to $R_{DS-ON}$ for either of switches $M_{5A}$ 460 and $M_{5B}$ 462. The voltage drop on switches $M_{5A}$ 460 and $M_{5B}$ 462 may be further mitigated by the controller switching ON switches $M_{5A}$ 460 and $M_{5B}$ 462 during time periods near time period 724 and 726 at approximately a zero duty cycle of the PWM scheme.

Figure 8:
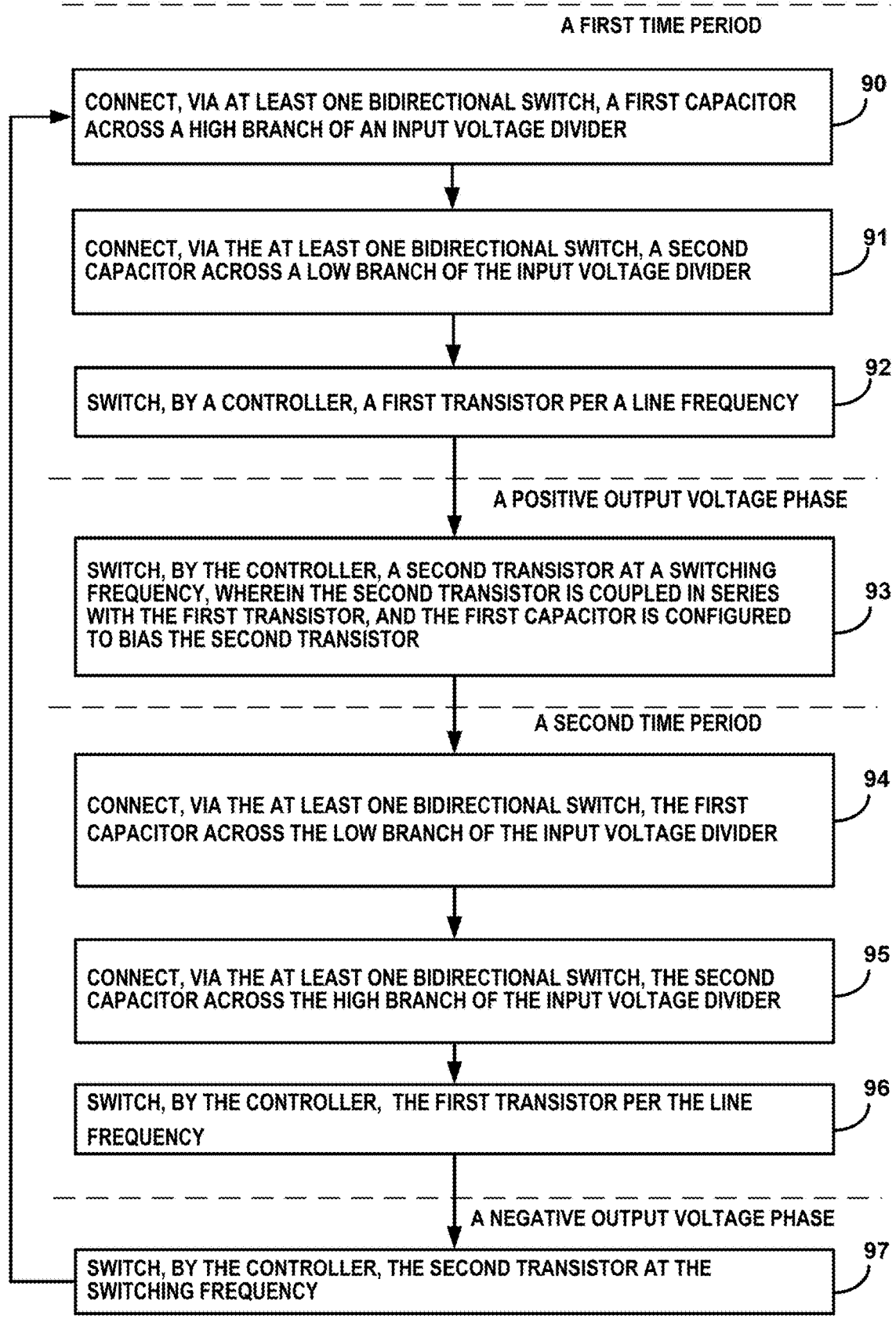
FIG. 8 is a flow chart illustrating an example operation of a power inverter circuit according to one or more techniques of this disclosure.

FIG. 8 is a flow chart illustrating an example operation of a power inverter circuit according to one or more techniques of this disclosure. The blocks of FIG. 8 will be described terms of FIGS. 4-5D, and FIG. 7. unless otherwise noted.

As described above in relation to FIG. 5B, during the time of phase B, bidirectional switches $M_{5A}$ 460 and $M_{5B}$ 462 connect capacitor $C_{F-A}$ 428 across Zhigh 480 (90) and connect capacitor $C_{F-B}$ 458 across Zlow 482 (91). As described above in relation to FIGS. 5A-5D, connecting the flying capacitors from each half bridge equalizes the voltage on each branch of the input divider by charge transfer of both of the half bridge capacitors $C_{F-A}$ 428 and $C_{F-B}$ 458.

Between the positive and negative output voltage phase, for example when voltage curve Vout(A) 764 becomes positive, a controller, such as controller 102 depicted in FIG. 1, may send a signal to the gate of a switch connected to one of the voltage rails, such as $M_{1A}$ 430 and $M_{1B}$ 440 to turn on or off according to the desired output line frequency, $f_{OUT}$ (92). Either phase A, depicted in FIG. 5A or phase C, depicted by FIG. 5C, may be considered the positive output voltage phase, depending on how the output voltage is defined. In other words, during operation, as can be seen in FIG. 7, the transistors connected to the voltage rails, e.g. $M_{1A}$ 430, $M_{4A}$ 436, $M_{1B}$ 440 and $M_{4B}$ 446 are switched by the controller at a desired line frequency $f_{OUT}$, for example 50 Hz. Therefore, use of the half bridge capacitors and the switching scheme of circuit 400 is different than for the flying capacitor voltage stage described above in relation to FIG. 2B.

During the positive output voltage phase, e.g. phase A, the transistors directly connected to the switching nodes, $M_{2A}$ 432, $M_{3A}$ 434, $M_{2B}$ 442 and $M_{3B}$ 444, are used to set the output voltage (Vout) to load $R_{OUT}$ 470. The controller may switch the gates of the fast switching transistors $M_{2A}$ 432, $M_{3A}$ 434, $M_{2B}$ 442 and $M_{3B}$ 444 at a switching frequency much higher frequency than the desired output frequency, as described above in relation to FIG. 1 (93). The voltage across the half bridge capacitors, which is ideally set to one-half Vdd 406, is configured to bias the fast switching transistors as well as the low switching transistors.

As described above in relation to FIG. 5D, during the time of phase D, bidirectional switches $M_{5A}$ 460 and $M_{5B}$ 462 connect capacitor $C_{F-A}$ 428 across Zlow 482 (94) and connect capacitor $C_{F-B}$ 458 across Zhigh 480 (95). As described above in relation to FIGS. 5A-5D, the connection during phase D is complementary to that for phase B. Therefore, the transfer charge of $C_{F-A}$ and $C_{F-B}$ is continuously providing equilibration of the voltage across each branch of the input voltage divider.

Between the positive to negative output voltage phase, for example when voltage curve Vout(A) 764 becomes negative at 722, the controller may send a signal to the gate of switches connected to the voltage rails, e.g. $M_{1A}$ 430, to turn on or off at the desired output line frequency, $f_{OUT}$ (96). During the negative voltage stage, e.g. phase C, the controller may cause the transistors directly connected to the switching nodes, $M_{2A}$ 432, $M_{3A}$ 434, $M_{2B}$ 442 and $M_{3B}$ 444 to switch according to the PWM scheme at the switching frequency, $f_{SW}$ (97).

In one or more examples, the functions described above may be implemented in hardware, software, firmware, or any combination thereof. For example, components of FIG. 1, such as controller 102 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media, may comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein, such as a processor or processing circuitry that may be included in controller 102, may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The techniques of this disclosure may also be described in the following examples.

Example 1

A method comprising: connecting, via at least one switch, a first capacitor across a high branch of an input voltage divider and connecting, via the at least one switch, a second capacitor across a low branch of the input voltage divider during a first time period, and connecting, via the at least one switch, the first capacitor across the low branch of the input voltage divider and connecting, via the at least one switch, the second capacitor across the high branch of the input voltage divider during a second time period different from the first time period.

Example 2

The method of example 1, further comprising: switching, by controller circuitry, a first transistor at a line frequency and switching a second transistor at a switching frequency, wherein: the second transistor is coupled in series with the first transistor, the first capacitor is configured to bias the second transistor, the first transistor is configured to couple an input voltage to the second transistor, the second transistor is configured to set a magnitude of an output voltage to a load.

Example 3

The method of any combination of examples 1-2, wherein the input voltage is a direct current (DC) voltage and the output voltage is an alternating current (AC) voltage.

Example 4

The method of any combination of examples 1-3, wherein the first time period and the second time period each comprise one half-cycle of the line frequency.

Example 5

The method of any combination of examples 1-4, wherein the second transistor is configured to set a magnitude of the output voltage based on pulse width modulation (PWM).

Example 6

The method of any combination of examples 1-5, wherein the switch is configured to switch ON while the second transistor is at approximately a zero duty cycle of the PWM.

Example 7

The method of any combination of examples 1-6, wherein the high branch of the input voltage divider comprises a first input capacitor and the low branch of the input voltage divider comprises a second input capacitor, and wherein connecting the first capacitor across the first input capacitor during the first time period and across the second input capacitor during the second time period provides a charge transfer to equalize a magnitude of voltage on the first input capacitor to a magnitude of voltage on the second input capacitor.

Example 8

A circuit comprising an input voltage divider configured to provide a divided voltage, wherein the divided voltage is approximately half of a difference between a supply voltage and a reference voltage, a switching circuit comprising a first half-bridge that includes a first switching node and a second half-bridge that includes a second switching node, and one or more switches, wherein the one or more switches is configured to connect the divided voltage to the first switching node and the second switching node.

Example 9

The circuit of example 8, wherein the one or more switches is a bidirectional switch.

Example 10

The circuit of any of examples 8-9 or any combination thereof, wherein the first half-bridge further comprises a capacitor, wherein the one or more switches is configured to: connect the capacitor between the supply voltage and the divided voltage during a first time and connect the capacitor between the divided voltage and the reference voltage during a second time.

Example 11

The circuit of any combination of examples 8-10, wherein the capacitor is a first capacitor and the second half-bridge further comprises a second capacitor, wherein the one or more switches is configured to: connect the second capacitor between the supply voltage and the divided voltage during the second time; and connect the second capacitor between the divided voltage and the reference voltage during the first time.

Example 12

The circuit of any combination of examples 8-11, wherein further comprising a first output element and a second output element, wherein: the first output element connects to the first switching node through a first low-pass filter, and the second output element connects to the second switching node through a second low-pass filter.

Example 13

The circuit of any combination of examples 8-12, wherein the first low-pass filter and the second low-pass filter each comprise at least one inductor and one capacitor.

Example 14

The circuit of any combination of examples 8-13, wherein the first half-bridge comprises: a first transistor directly coupled to the supply voltage; a second transistor directly coupled to the reference voltage, wherein the first transistor and the second transistor are configured to switch at a line frequency; a third transistor directly coupled to the first switching node; and a fourth transistor directly coupled to the first switching node, wherein the third transistor and the fourth transistor are configured to set a magnitude of a line output voltage of the circuit.

Example 15

The circuit of any combination of examples 8-14, wherein the voltage divider comprises: a high side including a first resistor and a first capacitor; and a low side including a second resistor and a second capacitor.

Example 16

A system comprising: an input voltage divider configured to provide a divided voltage, wherein the divided voltage is approximately half of a supply voltage, a switching circuit comprising a first half-bridge that includes a first switching node and a first capacitor and a second half-bridge that includes a second switching node and a second capacitor, a first switch, wherein the first switch is configured to connect the divided voltage to the first switching node, a second switch, wherein the second switch is configured to connect the divided voltage to the second switching node. The system may further comprise a controller configured to: control a first transistor of the first half bridge to operate at a line frequency and control a second transistor of the first half bridge to operate at a switching frequency, and connect, via the first switch, the first capacitor across a high branch of the input voltage divider and connect, via the second switch, a second capacitor across a low branch of the input voltage divider during a first time period.

Example 17

The system of example 16, wherein the controller is further configured to connect, via the first switch, the first capacitor across the low branch of the input voltage divider and connect, via the second switch, the second capacitor across the high branch of the input voltage divider during a second time period different from the first time period.

Example 18

The system of any combination of examples 15-17, wherein the first switch and the second switch are each a bidirectional switch.

Example 19

The system of any combination of examples 15-18, wherein the first transistor is directly coupled to the supply voltage, the second transistor is directly coupled between the first transistor and the first switching node, and wherein the first half-bridge further comprises: a third transistor directly coupled to the reference voltage, wherein the third transistor is configured to switch at the line frequency, and a fourth transistor directly coupled between the third transistor and the first switching node, wherein: the fourth transistor is configured to switch at the switching frequency, and the second transistor and the fourth transistor are configured to set a magnitude of a line output voltage of the system based on a pulse width modulation (PWM).

Example 20

The system of any combination of examples 15-19, wherein the supply voltage is a direct current (DC) voltage and the line output voltage is an alternating current (AC) voltage.

Example 21

A method comprising: connecting, via at least one bidirectional switch, a first capacitor across a high branch of an input voltage divider and connecting, via the at least one bidirectional switch, a second capacitor across a low branch of the input voltage divider during a first time period, and connecting, via the at least one bidirectional switch, the first capacitor across the low branch of the input voltage divider and connecting, via the at least one bidirectional switch, the second capacitor across the high branch of the input voltage divider during a second time period different from the first time period.

Various examples of the disclosure have been described. These and other examples are within the scope of the following claims.

The invention claimed is:

1. A method comprising:
connecting, via at least one switch, a first capacitor across a high branch of an input voltage divider and connecting, via the at least one switch, a second capacitor across a low branch of the input voltage divider during a first time period; and
connecting, via the at least one switch, the first capacitor across the low branch of the input voltage divider and connecting, via the at least one switch, the second capacitor across the high branch of the input voltage divider during a second time period different from the first time period,
wherein the first switch and the second switch are connected in series, and
wherein a first node between the first switch and the second switch connects to a second node that divides the high branch of the input voltage divider from the low branch.

2. The method of claim 1, further comprising:
switching a first transistor at a line frequency and a second transistor at a switching frequency, wherein:
the second transistor is coupled in series with the first transistor,
the first capacitor is configured to bias the second transistor,
the first transistor is configured to couple an input voltage to the second transistor,
the second transistor is configured to set a magnitude of an output voltage to a load.

3. The method of claim 2, wherein the input voltage is a direct current (DC) voltage and the output voltage is an alternating current (AC) voltage.

4. The method of claim 2, wherein the first time period and the second time period each comprise one half-cycle of the line frequency.

5. The method of claim 2, wherein the second transistor is configured to set a magnitude of the output voltage based on pulse width modulation (PWM).

6. The method of claim 5, wherein the switch is configured to switch on while the second transistor is at approximately a zero duty cycle of the PWM.

7. The method of claim 1,
wherein the high branch of the input voltage divider comprises a first input capacitor and the low branch of the input voltage divider comprises a second input capacitor, and
wherein connecting the first capacitor across the first input capacitor during the first time period and across the second input capacitor during the second time period provides a charge transfer to equalize a magnitude of voltage on the first input capacitor to a magnitude of voltage on the second input capacitor.

8. A circuit comprising:
an input voltage divider configured to provide a divided voltage, wherein the divided voltage is approximately half of a difference between a supply voltage and a reference voltage;
a switching circuit comprising a first half-bridge that includes a first switching node and a second half-bridge that includes a second switching node; and
a first switch connected in series with a second switch,
wherein the divided voltage is electrically connected to a node between the first switch and the second switch;
wherein the first switch is configured to connect the divided voltage to the first switching node, and
wherein the second switch is configured to connect the divided voltage to the second switching node.

9. The circuit of claim 8, wherein the first switch is a bidirectional switch.

10. The circuit of claim 8, wherein the first half-bridge further comprises a capacitor, wherein: the first switch is configured to:
connect the capacitor between the supply voltage and the divided voltage during a first time; and
connect the capacitor between the divided voltage and the reference voltage during a second time.

11. The circuit of claim 10, wherein the capacitor is a first capacitor and the second half-bridge further comprises a second capacitor, wherein the second switch is configured to:
connect the second capacitor between the supply voltage and the divided voltage during the second time; and
connect the second capacitor between the divided voltage and the reference voltage during the first time.

12. The circuit of claim 8 further comprising a first output element and a second output element, wherein:
the first output element connects to the first switching node through a first low-pass filter, and
the second output element connects to the second switching node through a second low-pass filter.

13. The circuit of claim 12, wherein the first low-pass filter and the second low-pass filter each comprise at least one inductor and one capacitor.

14. The circuit of claim 8 wherein the first half-bridge comprises:
a first transistor directly coupled to the supply voltage;
a second transistor directly coupled to the reference voltage, wherein the first transistor and the second transistor are configured to switch at a line frequency;
a third transistor directly coupled to the first switching node; and
a fourth transistor directly coupled to the first switching node, wherein the third transistor and the fourth transistor are configured to set a magnitude of a line output voltage of the circuit.

15. The circuit of claim 8, wherein the voltage divider comprises:
a high side including a first resistor and a first capacitor; and
a low side including a second resistor and a second capacitor.

16. A system comprising:
an input voltage divider configured to provide a divided voltage, wherein the divided voltage is approximately half of a difference between a supply voltage and a reference voltage;
a switching circuit comprising a first half-bridge that includes a first switching node and a first capacitor and a second half-bridge that includes a second switching node and a second capacitor;
a first switch, wherein the first switch is configured to connect the divided voltage to the first switching node;
a second switch, wherein the second switch is configured to connect the divided voltage to the second switching node, and wherein the second switch is connected in series with the first switch; and
a controller configured to:
control a first transistor of the first half bridge to operate at a line frequency and control a second transistor of the first half bridge to operate at a switching frequency; and
connect, via the first switch, the first capacitor across a high branch of the input voltage divider and connect, via the second switch, the second capacitor across a low branch of the input voltage divider during a first time period.

17. The system of claim 16, wherein the controller is further configured to connect, via the first switch, the first capacitor across the low branch of the input voltage divider and connect, via the second switch, the second capacitor across the high branch of the input voltage divider during a second time period different from the first time period.

18. The system of claim 17, wherein the first switch and the second switch are each a bidirectional switch.

19. The system of claim 16 wherein:
the first transistor is directly coupled to the supply voltage;
the second transistor is directly coupled between the first transistor and the first switching node;
and wherein the first half-bridge further comprises:
a third transistor directly coupled to the reference voltage, wherein the third transistor is configured to switch at the line frequency; and
a fourth transistor directly coupled between the third transistor and the first switching node, wherein:
the fourth transistor is configured to switch at the switching frequency, and
the second transistor and the fourth transistor are configured to set a magnitude of a line output voltage of the system based on a pulse width modulation (PWM).

20. The system of claim 19, wherein the supply voltage is a direct current (DC) voltage and the line output voltage is an alternating current (AC) voltage.

* * * * *